United States Patent [19]

Hanson

[11] 4,024,804
[45] May 24, 1977

[54] ROTARY BALING MACHINE WITH TWINE FEEDING MECHANISM AND ARTICULATED DRIVE ASSEMBLY

[75] Inventor: Darwin M. Hanson, West Bend, Wis.

[73] Assignee: Gehl Company, West Bend, Wis.

[22] Filed: Nov. 17, 1975

[21] Appl. No.: 632,269

[52] U.S. Cl. .................................. 100/5; 56/341; 74/15.69; 100/88; 180/14 R; 180/70 P

[51] Int. Cl.² ................. B65B 13/18; A01D 39/00

[58] Field of Search .................. 100/5, 13, 88, 7; 56/341, 342, 343; 74/15.69; 180/14 R, 14 A, 14 B, 70 P

[56] References Cited

UNITED STATES PATENTS

| | | | |
|---|---|---|---|
| 2,336,491 | 12/1943 | Luebben | 100/5 |
| 3,722,197 | 3/1973 | Vermeer | 56/341 |
| 3,894,484 | 7/1975 | Anstey | 100/5 |
| 3,914,926 | 10/1975 | Braunberger | 56/341 |
| 3,964,246 | 6/1976 | Kopaska | 56/341 |
| 3,988,977 | 11/1976 | Anderson | 100/5 |

*Primary Examiner*—Billy J. Wilhite
*Attorney, Agent, or Firm*—James E. Nilles

[57] ABSTRACT

A rotary baling machine for forming large cylindrical bales of cut crop material such as hay which includes an improved twine feeding mechanism for winding twine around the formed bales and an improved articulated drive shaft extending from the power source of the towing vehicle to the power transmitting means of the baling machine for driving the baling mechanism. The twine feeding mechanism includes an improved twine guiding and feeding means which permits controlled and uniform wrapping of twine around the desired length of the bale and further includes a simplified means for cutting the twine at the completion of each bale wrapping cycle. The twine feeding mechanism is driven by a hydraulic means which can be readily controlled by the tractor operator whereby the operator can regulate the amount and position of twine wound around the bale. The power transmitting means of the baling machine and the articulated drive means connecting the power take-off of the towing vehicle to the power transmitting means are positioned laterally with respect to the center line of the baling machine to avoid the collection of undesirable debris in front of the bale forming area and to permit the operator an unobstructed view of the baling mechanism and twine wrapping mechanism and increased control over these operations. The articulated drive means is particularly provided with means for permitting a wide range of horizontal angular displacement of the towing vehicle and the baler and for transmitting power to the power transmitting means at a constant angular velocity.

8 Claims, 18 Drawing Figures

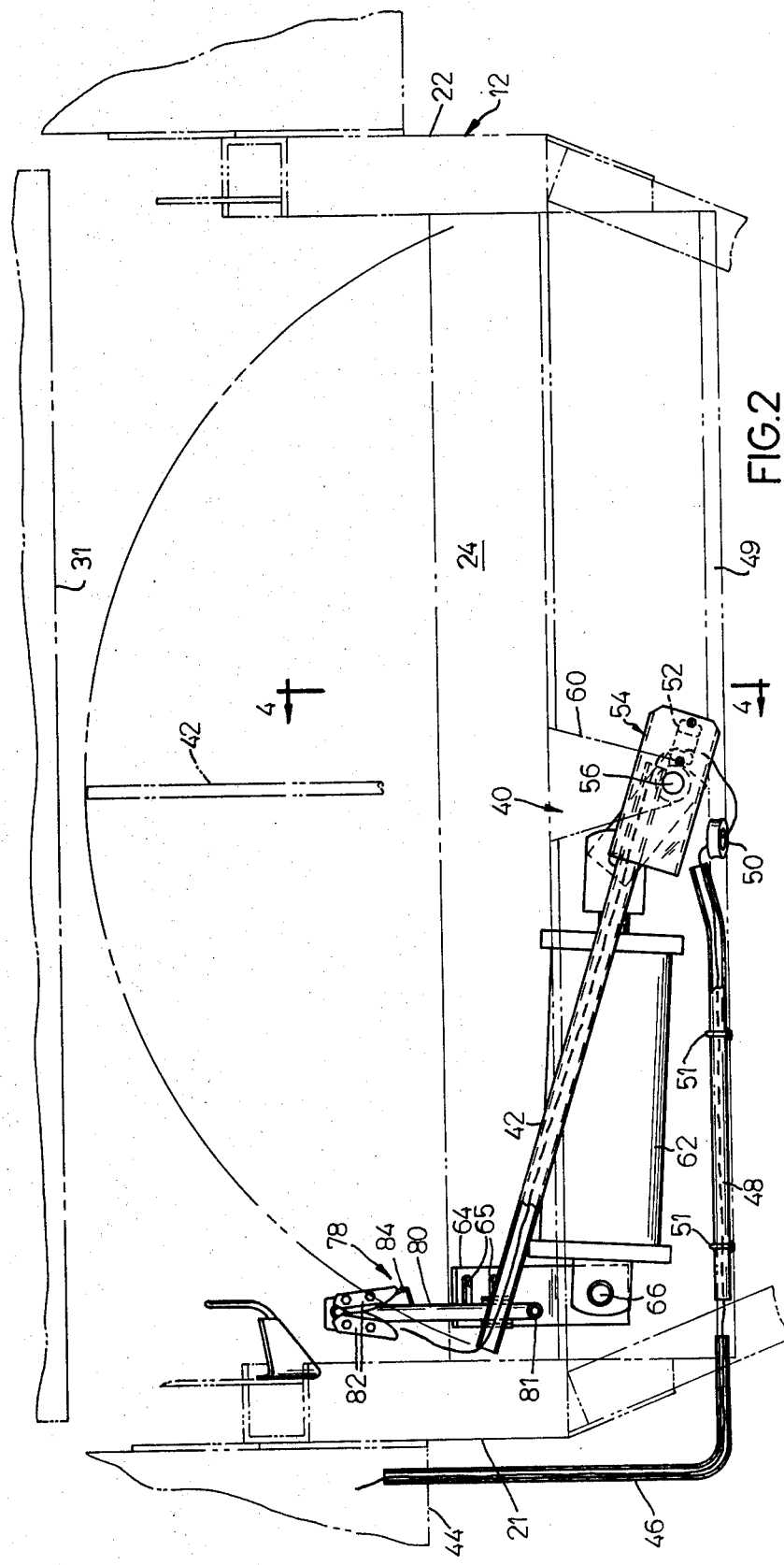
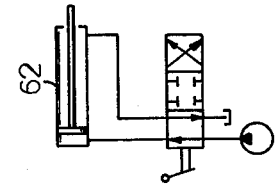
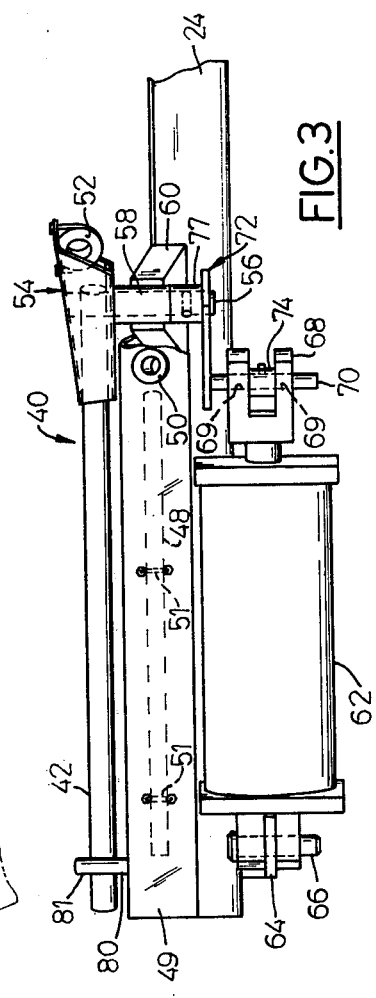

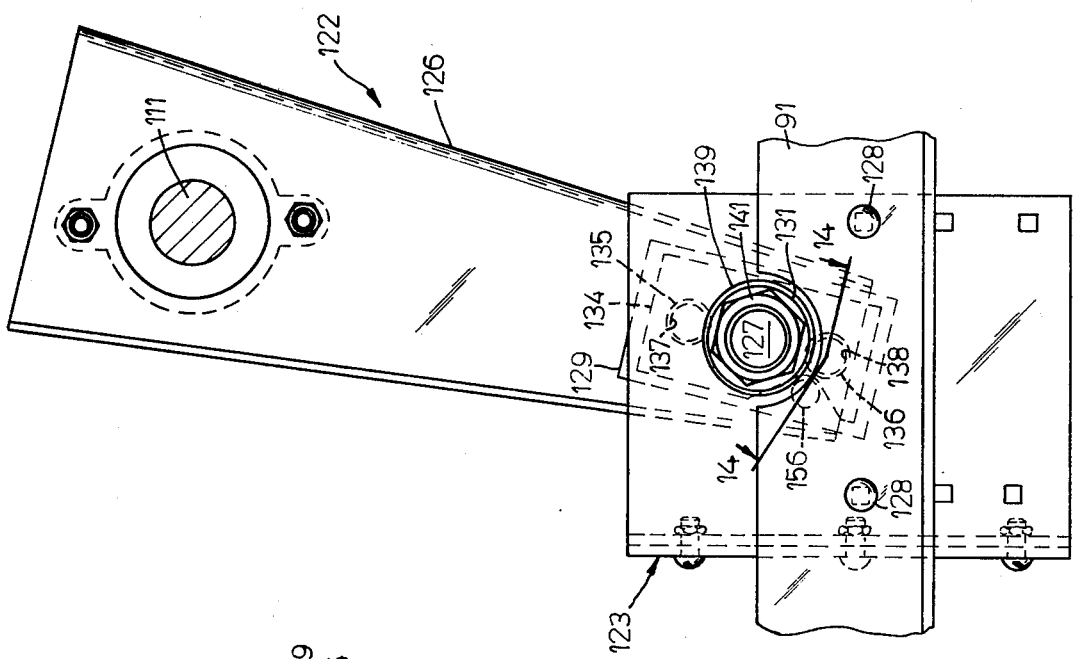
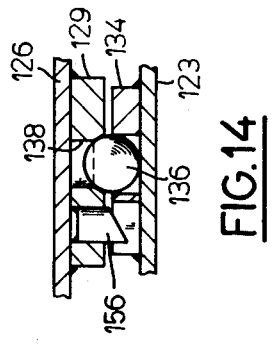
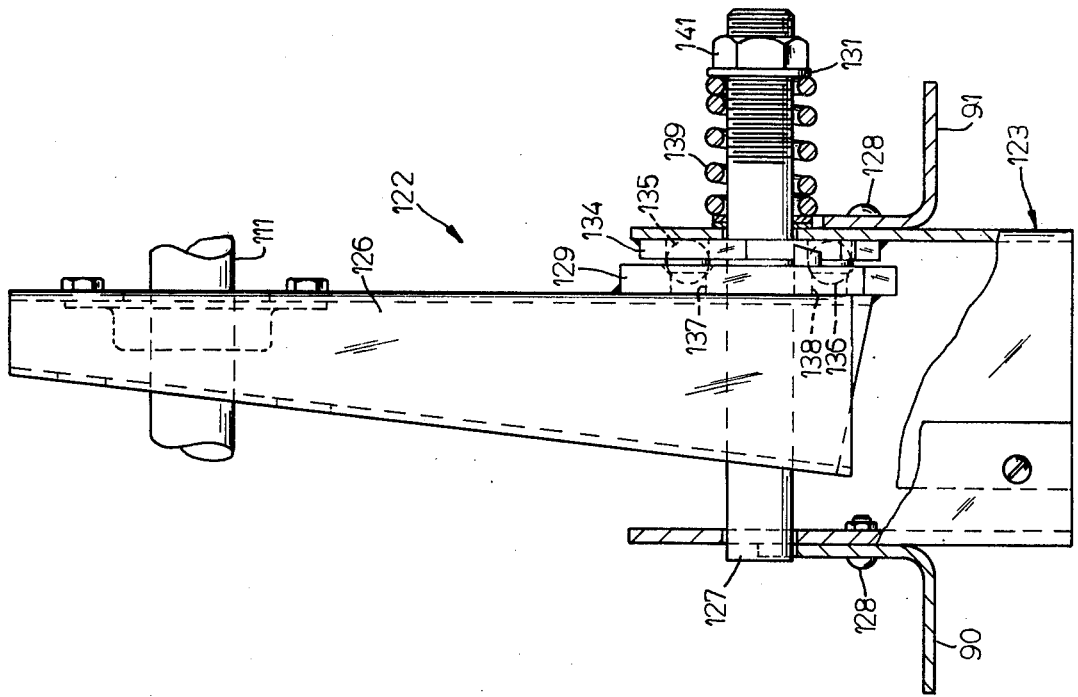

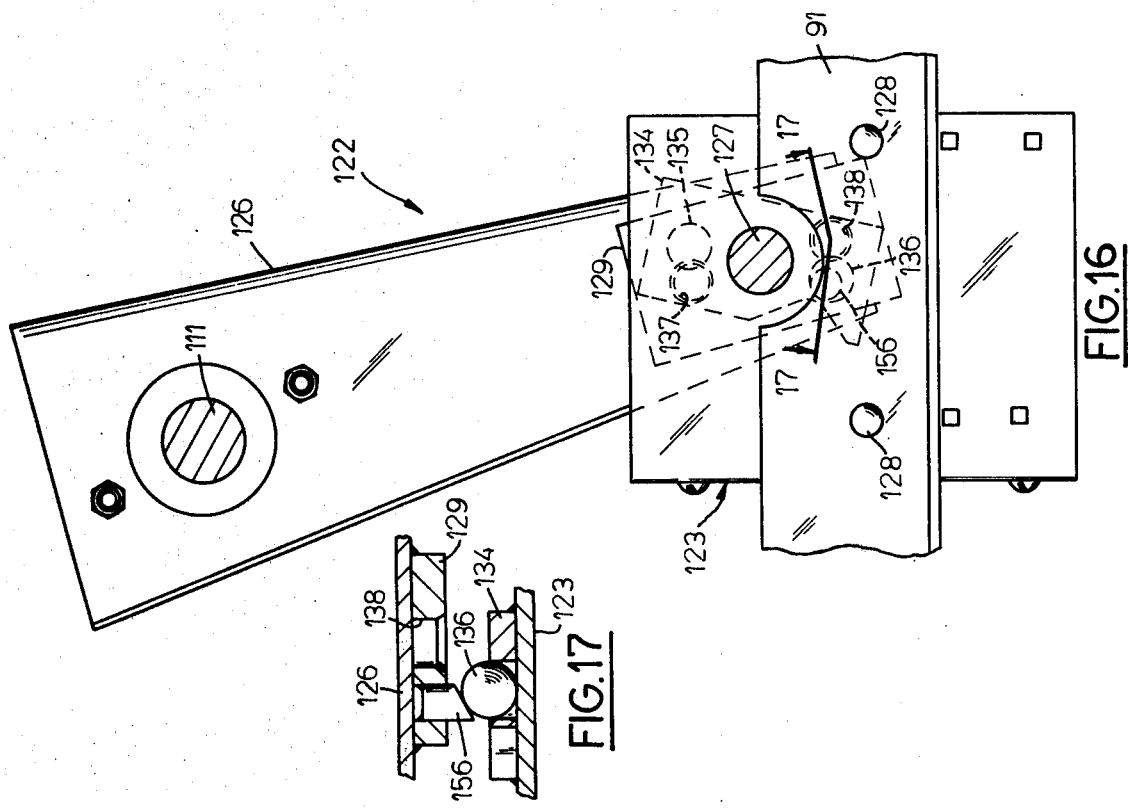

ROTARY BALING MACHINE WITH TWINE FEEDING MECHANISM AND ARTICULATED DRIVE ASSEMBLY

BACKGROUND OF THE INVENTION

This invention relates to baling machines which form large cylindrical bales of cut crop material such as hay. More particularly, the invention relates to baling machines which employ a plurality of conveyor belts to roll cut crop into a bale and to compact the bale into a tight cylindrical form as shown in U.S. Pat. No. 3,894,484, issued July 25, 1975 to Anstey et al. and as described in U.S. Pat. No. 3,914,926, issued Oct. 28, 1975 to Braunberger. In such baling machines, hay is received between a feed roller and a conveyor belt and passed to an elongated core forming area where it is rolled between the conveyor belt and compacting belts which cause the hay to form a rotating cylinder extending transversely to the direction of motion of the baler. As hay is fed into the baler, the bale grows in size causing the compacting belts to deflect consequently increasing the size of the bale forming zone. When the bale is fully formed it is generally desirable to wrap the bale with twine before it is discharged from the baler.

SUMMARY OF THE INVENTION

The present invention provides an improved rotary baling machine which includes a more effective and dependable twine feeding machanism and which further includes an improved articulated drive means, connecting the baling machine and the towing tractor and permitting the operator to observe the bale forming means and the twine feeding assembly in operation so that he can control the baling operation and the twine wrapping process.

The twine feeding apparatus of the invention includes a hollow pivotable twine feeding arm which is designed to guide the twine such that a free end of the twine can be fed into the bale forming zone whereby continued rotation of the bale will cause the twine to be firmly wrapped around the bale. The guide arm is pivotably mounted at one end such that the opposite end of the arm traverses an arcuate path as twine is being wrapped around the bale and guides the twine along the length of the bale it is wound around. The arcuate movement of the twine guide arm is controlled by a hydraulic means in turn actuatable by a hydraulic valve controlled by the vehicle operator. This guide arm control means permits the operator to regulate the wrapping operation at his discretion.

The twine feeding apparatus also includes improved means for cutting the twine at the completion of the twine wrapping cycle. The cutting apparatus of the invention includes only a single moving part which is actuated by the motion of the guide arm at the completion of the wrapping cycle. Actuation by the guide arm brings the cutting element into engagement with the twine such that the tension on the twine caused by rotation of the bale pulls the twine into cutting engagement with the blades. Prior art severing means include such devices as anvils which are pivotable upwardly to force the twine into cutting engagement with a blade in order to sever the twine. Such devices are unduly sensitive in that they require a precise engagement between a cutting blade and a pivotable anvil.

The baling machine of the present invention also includes a power transmitting means which is mounted at one side of the baler and an improved articulated drive means which connects the power take-off of the tractor to the power transmitting means. The power transmitting means and the articulated drive means are thus mounted so as to permit the tractor operator a clear view of the bale forming area and of the twine feeding mechanism so that the baling process and the twine feeding operation can be properly controlled. By positioning the power transmitting means and the drive assembly away from the center of the machine, buildup of debris in front of the bale forming area is also avoided and the operation of the baler is improved. The articulated drive means of the invention also includes means to provide a smooth power transfer between the power source of the towing vehicle and the power transmitting means of the baler throughout a wide range of relative turning angles of the tractor and the rotary baler.

BRIEF DESCRIPTION OF THE DRAWINGS

FIG. 2 is a plan view of the twine wrapping mechanism of the present invention.

FIG. 2A is a fluid diagram showing the hydraulic fluid valve and the hydraulic fluid circuit operably connected with the hydraulic motor used in the present invention.

FIG. 3 is a view taken generally along the line 3—3 in FIG. 4.

FIG. 13 generally shows an enlarged cross-sectional view taken along the line 13—13 in FIG. 8.

FIG. 14 is an enlarged cross-sectional view taken along the line 14—14 in FIG. 13.

FIG. 15 is an enlarged generally cross-sectional view taken along the line 15—15 in FIG. 8.

FIG. 16 is a view similar to FIG. 13 but showing the vertically extending drive shaft supported in the position assumed when the tractor has turned at an angle as shown in FIG. 12.

FIG. 17 is an enlarged cross-sectional view taken along the line 17—17 in FIG. 16.

DESCRIPTION OF THE PREFERRED EMBODIMENT

Figure 1:
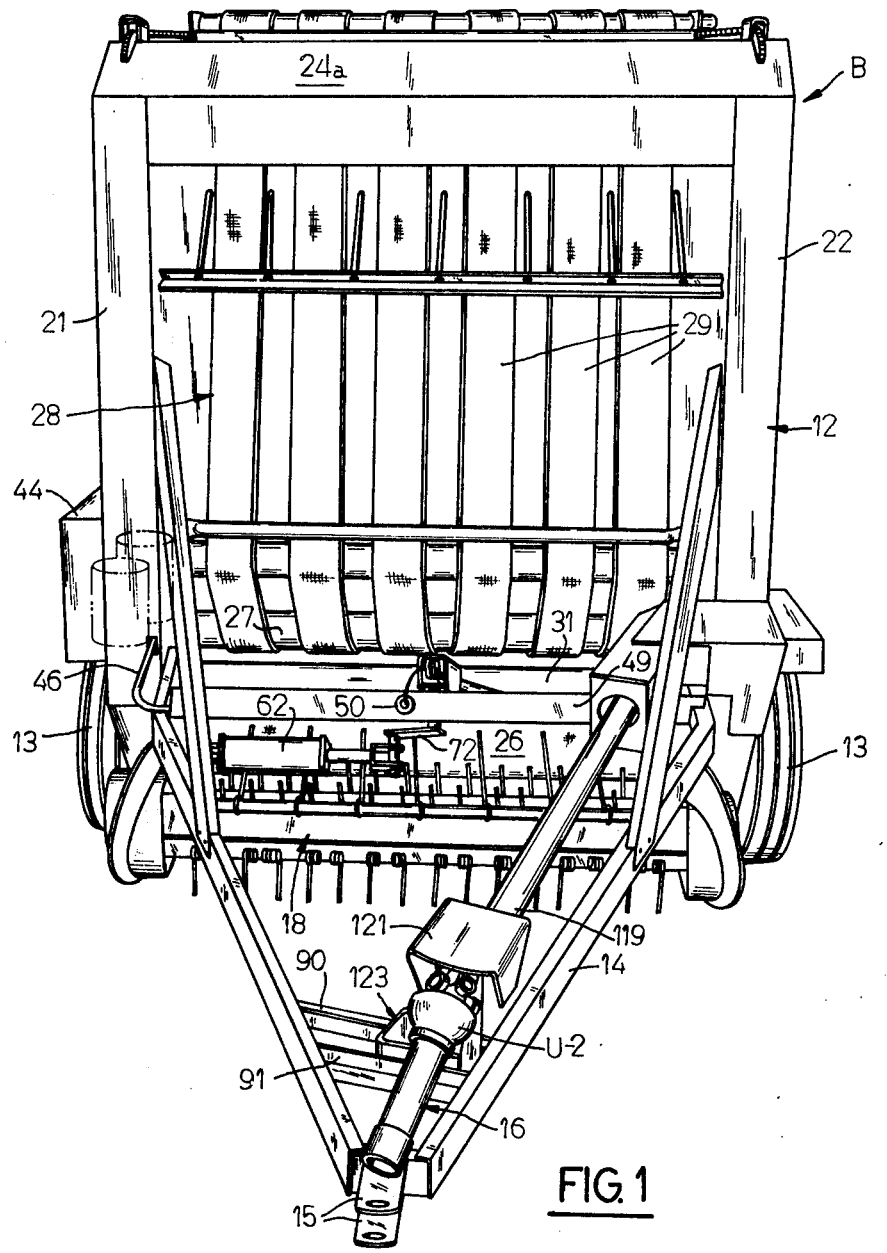
FIG. 1 is an isometric view of the front of a rotary baler.

FIG. 1 illustrates a rotary baling machine B which embodies the present invention. The rotary baling machine B includes a mobile frame or body portion 12 which is supported in elevated position with respect to the ground by ground engaging wheels 13. A tongue structure 14 extends forwardly from the body portion 12 and has a forward end which is adapted for a conventional towing connection for a draft vehicle such as a tractor. An articulated drive shaft 16 is supported from the tongue 14 and is adapted for connection to the conventional power take-off mechanism on the tractor whereby power is supplied to operate various mechanisms of the baling machine B. A rotary crop pick-up mechanism 18 which rotates about a horizontal transverse axis, is suspended below the tongue 14 from a forward position of the body 12 such that it can be lowered into a crop engaging position for delivery of cut crop such as hay to the baling machine B.

The baling machine functions to receive the cut crop from the rotary crop pick-up mechanism 18 and to roll the crop to form large cylindrical bales having a diameter ranging from 2 to 6 feet and to then eject the bales from the rear of the machine in a manner which is more fully described in U.S. Pat. No. 3,914,926, issued Oct. 28, 1975 to Braunberger.

Figure 4:
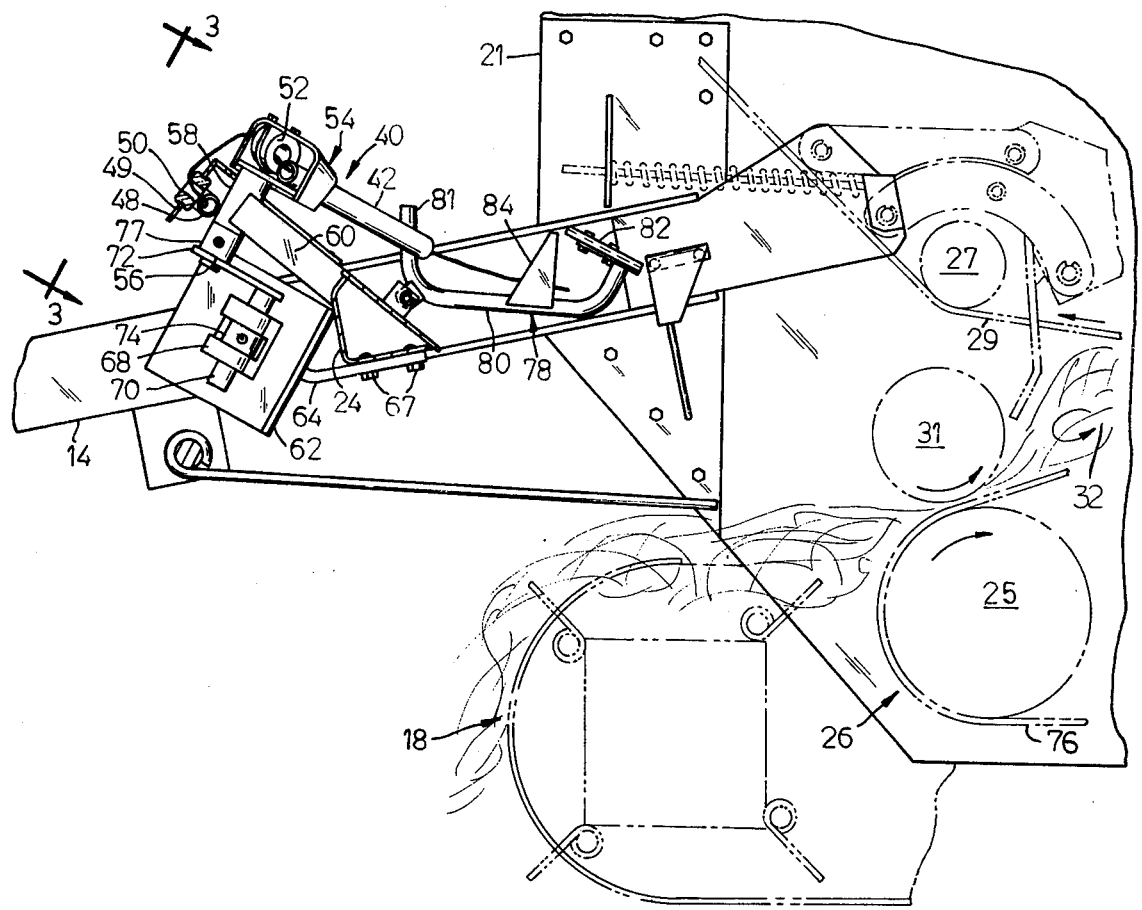
FIG. 4 is a view taken generally along the line 4—4 in FIG. 2.
Figure 5:
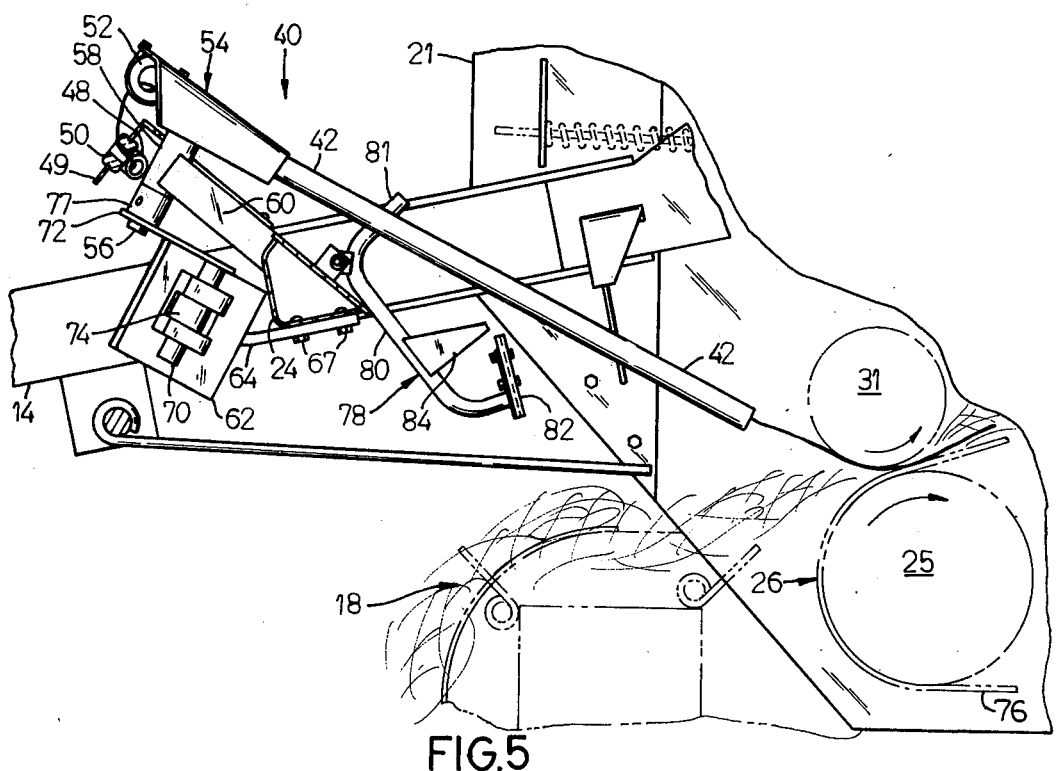
FIG. 5 is a view similar to FIG. 4 but showing the twine guiding arm in a position wherein twine is initially fed into the bale mechanism.

The body portion 12 of the baling machine B includes a pair of vertically disposed walls 21 and 22 which are held apart in spaced relationship with respect to each other by an upper transverse frame member 24a and a lower transverse frame member 24. A conveyor belt assembly 26 (FIGS. 4-6) is disposed between the walls 21 and 22 and extends across the full width between the walls to form a generally horizontal conveying platform to receive cut crop material. The conveyor belt assembly includes in part, a conveyor belt 76 which is supported by a cylindrical roller 25 extending between the walls 21 and 22. Also disposed between the walls 21 and 22 is an upper belt assembly 28 formed by a plurality of spaced belts 29 which are supported for simultaneous movement in the direction shown in FIG. 4 and which function in conjunction with the conveyor belt assembly 26 to roll the cut crop material into a bale. Above the forward end of the conveyor belt assembly 26 is a packer roller 31 which is best seen in FIGS. 4 and 5. The cut crop material is received from the rotary crop pick-up mechanism 18 between the packer roller 31 and the conveyor belt assembly 26 and is forced into a bale forming zone or chamber 32 by the rotation of the roller 31 and conveyor belt assembly 26 in the directions shown in FIG. 4. The cut crop received in the bale forming zone or chamber initially forms a small rotating mass of cut material which grows in size as additional cut crop material is fed into the zone. The upper belt assembly 28 comprised of parallel spaced belts 29 includes means which permit the bale forming zone to expand in size to accommodate the bale as it grows but maintains pressure on the bale so that it is compacted while it is being formed.

TWINE FEEDING MECHANISM

When the bale, which is formed in the bale forming zone has reached the desired size, the twine feeding mechanism 40 is actuated to wrap twine around the bale to secure the bale in a tightly compressed relationship after it has been ejected from the baling machine. The twine feeding mechanism 40 generally includes a pivoting twine feeding tube 42 which is capable of traversing an arc for feeding twine into the bale forming area such that it can be wound around a finished bale and for then guiding the twine from one end of the bale to the other as the twine is wrapped around the bale during rotation of the bale.

The twine feeding mechanism of the present invention includes a twine supporting box 44 which is rigidly attached to the side wall 21 of the rotary baling machine B and which is capable of holding an adequate supply of twine, e.g., two spools. A twine feeding tube 46 extends forwardly from the twine box 44 to guide a strand of twine from the twine box 44. The twine is then conducted through a second twine feeding tube 48 which is secured within a shield member 49 by clamps 51. The shield member 49 is rigidly secured to the transversely extending frame structure 24. The twine is fed from the end of the twine feeding tube 48 through a twine guide 50 which is held within a bore in shield 49. The twine is then conducted through a second twine guide 52 and then through the pivoting twine tube 42.

The twine tube 42 is pivotably mounted such that it moves in an arc as shown by the dashed lines in FIG. 2. The twine tube slopes generally downwardly from its pivot point such that when it is in the position shown by the phantom lines in FIG. 2, the lower end of the twine tube is closely adjacent to the packer roller 31 and the conveyor belt assembly 26 as shown in FIG. 5.

The pivoting twine tube 42 is rigidly attached at one end to a tube support assembly 54 which is in turn pivotable about a pivot pin 56. The pivot pin 56 is in turn pivotably received in a rigid bushing 58 integrally connected to a supporting mount 60 which extends upwardly and forwardly from the frame member 24. The pivoting twine tube 42 is activated to pivot about pivot pin 56 and to swing in an arcuate path by a fluid actuated motor 62. The motor 62 is mounted to the frame member 24 by an adjustable motor mount 64. The motor mount 64 comprises a bracket including a pair of slots 65 which receive bolts 67 in such a manner that the bracket can be adjustably secured to the bottom of the frame member 24. The pivot pin 66 connecting the motor 62 to the motor mount 64 permits limited pivotal movement of the motor with respect to the motor mount. The piston end of the motor 62 is provided with a clevis 68 which includes a pair of aligned bores 69 therethrough for receiving a shaft 70 of a lever assembly 72. The shaft 70 is pivotable within the bores 69 but is secured therein by a bushing 74 which is fixed to the shaft 70. The lever assembly 72 includes an integrally connected upwardly extending lever assembly bushing 77 for receiving the lower end of the pivot pin 56. Complementary bores extend through the lever assembly bushing 77 and through the lower end of the pivot pin 56 for receiving a shear pin therethrough to rigidly secure pivot pin 56 for rotation with the lever assembly 72. Actuation of the fluid motor 62 will thus cause pivotal movement of the lever assembly 72 and consequent rotation of the pivot pin 56 within the rigid bushing 58 and will cause arcuate swinging motion of the pivoting twine tube 42. Through the means illustrated for causing the twine tube 42 to pivot includes a fluid motor 62, othe embodiments of the invention could employ electric motor means.

The twine feeding mechanism 40 of the present invention also includes a twine cutting assembly 78 which is provided to permit cutting of the twine at the end of the twine wrapping sequence as will be described hereafter. The twine cutting assembly generally comprises a blade support assembly tube 80 which is pivotably mounted to the frame member 24. The blade support assembly tube 80 includes an upwardly extending projection 81 at one end and a pair of cutting blades 82 secured to the other end. An upwardly extending blade guard plate 84 is secured to the blade support tube 80 intermediate its ends and functions to protect the blades from contact by the twine tube if the twine tube begins to move in its arcuate path and the blade support tube 80 fails to pivot downwardly to the position shown in FIG. 5.

OPERATION

Figure 6:
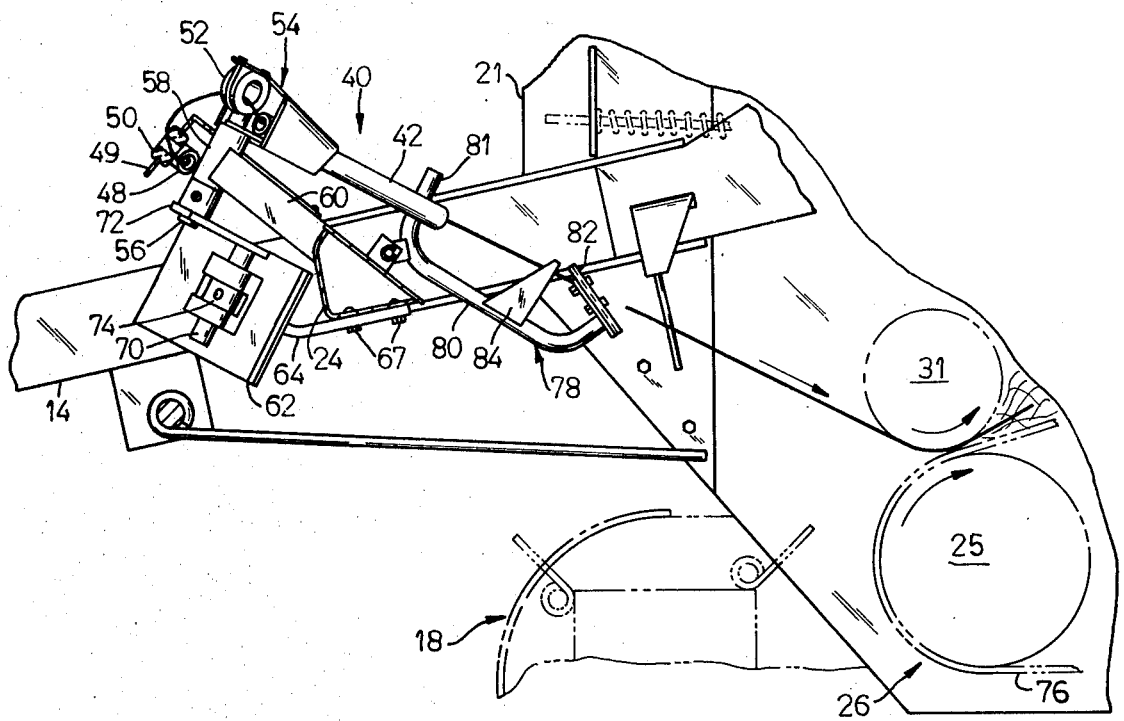
FIG. 6 is a view similar to FIGS. 4 and 5 particularly showing the manner in which the twine is cut at the end of the wrapping cycle.
Figure 7:
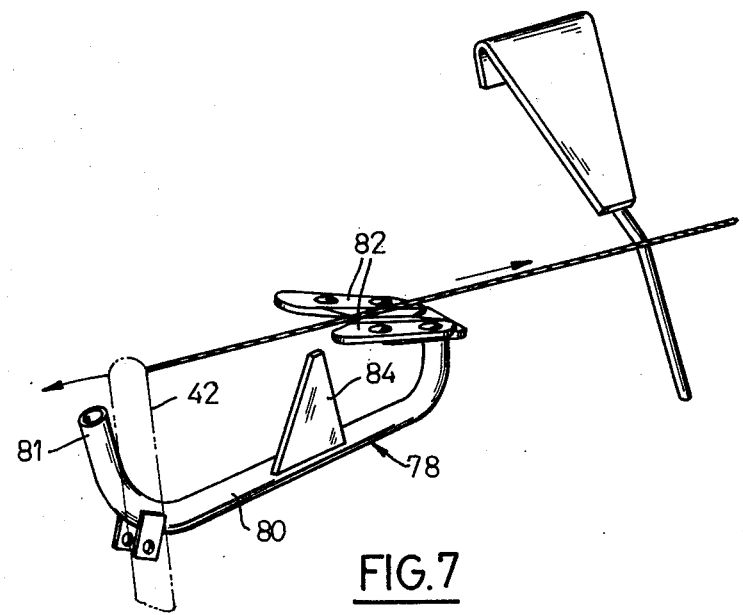
FIG. 7 is a detailed view of the twine cutting apparatus of the present invention.

When the bale formed in the rotary baling machine has reached the desired size such that it is desired that twine be wound around the bale and the bale discharged from the baling machine, the tractor will halt movement of the baling machine. The conveyor belts 23 and 29, however, will continue to rotate such that the large bale will continue to rotate. The tractor operator may then actuate a hydraulic valve means on the tractor to actuate the fluid actuated motor 62 and cause extension of the piston. This in turn causes rotation of the lever assembly 72 and the pivot pin 56 such that the pivoting twine tube 42 rotates from the position shown in FIGS. 2-4 to a position as shown in FIG. 5 and as shown by the phantom lines in FIG. 2. In this position the tag end of the twine, which is left extending from the end of the pivoting twine tube 42 after the previous twine wrapping process, can be received in the remainder of the cut crop material which is being fed between the packer roller 31 and the conveyor belt assembly 26. The twine will then be pulled by the packer roller 31, the conveyor assembly 26 and by the remainder of the cut crop material into the bale forming zone or chamber 32 and will be wound around the bale by the rotation of the bale within the bale forming zone. Continuous rotation of the bale as well as of the packer roller 31 and the conveyor belt assembly 26 causes continuous feeding of the twine through the pivoting twine tube 42. In order to secure the bale along its entire length, it is desirable to swing the pivoting twine tube 42 in an arcuate path whereby the twine is wound around the bale along the entire length of the bale. Such arcuate motion is accomplished by actuation of the motor 62 such that the piston is first fully extended and then retracted whereby the lever assembly will cause arcuate motion of the twine tube 42,. As stated, the hydraulic motor is controlled by a hydraulic valve means operated by the tractor operator. By selective operation of the hydraulic motor, the operator can control the position of the end of the twine feeding tube to control the amount of twine wrapped around the bale. At his discretion, the operator may cause the twine feeding tube to swing in a continuous arc at a constant speed thereby winding twine around the bale evenly from one end to the other or he may intermittently halt the traverse of the tube to wrap additional amount of twine around portions of the bale to increase the strength of the wrapping. When the bale has been sufficiently wrapped with twine, the pivoting twine tube 42 will traverse toward the position shown in FIG. 2. As the pivoting tube 42 moves toward this position, the twine cutting assembly will be positioned as shown in FIG. 5. However, as the twine tube 42 completes its arcuate stroke, the end of the twine tube will contact the upwardly extending projection 81 of the blade supporting tube 80 and will cause the blade supporting tube 80 to pivot such that the twine cutting knives 82 move upwardly to receive the twine as shown in FIG. 6. The continual pulling of the twine by the rotation of the bale will pull the twine through the twine cutting knives 82 causing the twine to be severed in a manner which is best shown in FIG. 7, leaving a tag end extending from the end of tube 42. The remainder of the twine will then be wound around the bale and the bale can be ejected from the rotary baling machine. The twine wrapping assembly is left in original position and the hydraulic motor is left with the piston fully withdrawn to prevent it from rusting.

BALER DRIVE MECHANISM

Figure 8:
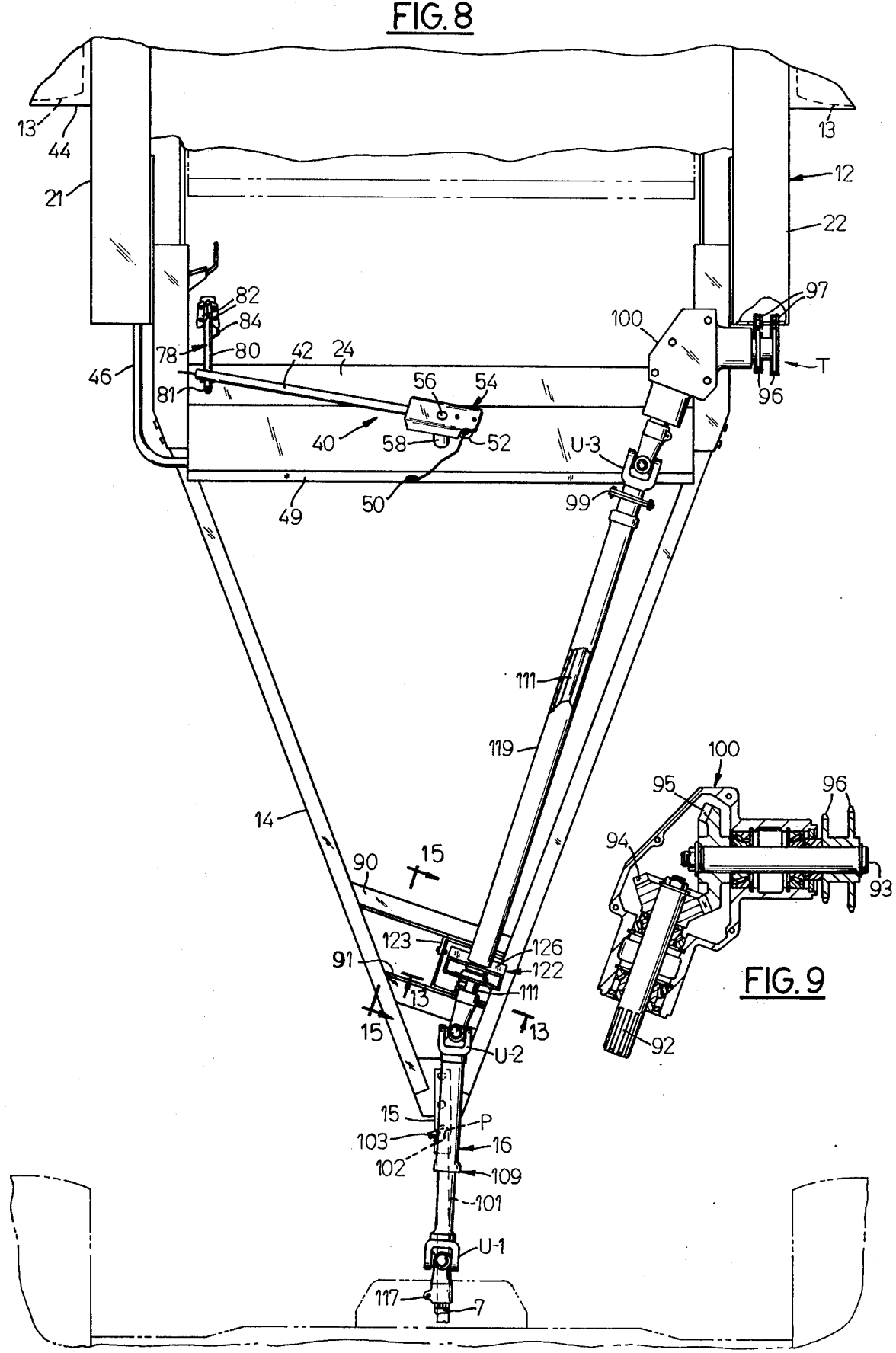
FIG. 8 is a somewhat schematic plan view of the means for connecting the baler to a tractor and showing this means when the tractor is in a straight ahead driving condition.

As best illustrated in FIGS. 1 and 8, the baling machine of the present invention includes a power transmitting assembly T which is positioned to the left of the center line of the baling machine and to the left of the center line of the power take-off shaft 7 of the towing vehicle. By mounting the power transmitting assembly T at one side of the baling machine B rather than directly in front of the bale forming area, the operator is permitted an unobstructed view of both the baling mechanism and the twine wrapping mechanism because it is then possible to eliminate the use of drive members and extra guard means positioned in front of the bale forming zone which collect debris.

An unobstructed view of the baling operation is particularly desirable since the windrows are generally narrower than the width of the bale to be formed and it is therefore necessary to cause the baling machine to move back and forth across the windrow as it moves along the length of the windrow to ensure that the cut crop material is fed evenly into the bale forming zone. By permitting the operator a clear view of the bale forming zone he can operate the machine so as to control the amount of crop material fed into the bale forming zone along its length.

Mounting the power transmitting means T to the left of the center line of the take-off shaft 7, however, dictates the use of a drive shaft assembly extending between the power take-off shaft 7 and the power transmitting assembly T at an angle with respect to the center line of the power take-off shaft 7. An important requirement for the satisfactory operation of such a drive shaft assembly is that it permit substantial angular displacement of the towing vehicle and the baling machine during turning but at the same time maintain a smooth power transmission to the power transmitting means T of the baler. It is readily apparent that mounting the drive shaft assembly at an angle with respect to the power take-off shaft 7 of the towing vehicle aggravates the design problems inherent in providing a drive shaft assembly which will permit such a substantial angular displacement of the towing vehicle in the baling machine. For example, if the towing vehicle shown in FIG. 1, turns to the left, the angle between the center line of the power take-off shaft 7 and the drive shaft assembly rapidly becomes relatively sharp. The present invention, however, provides an improved articulated drive shaft 16 which transmits the rotation of the power take-off shaft 7 to the power transmitting means T of the baling machine B at a constant angular velocity and through a wide range of turning angles. The articulated drive shaft also includes means which are particularly provided to protect the articulated drive means in the event that bottoming occurs during sharp left turns.

The conventional tractor used to pull the baler of the present invention includes a rearwardly extending drawbar 101 for receiving the projecting rigid tongue structure 14 of the baler in such a manner that a forked forward end 15 of the tongue structure 14 overlaps the rear end 102 of the drawbar. A manually insertable hitch pin 103 is provided to extend through aligned openings in the forked forward end 15 of the tongue 14 so as to provide a vertical pivot axis P that connects the tractor to the baler.

Figure 9:
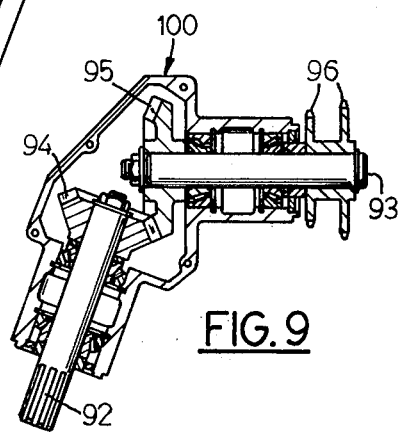
FIG. 9 is a cross-sectional plan view of the transmission used in the articulated drive means of the present invention.

The power transmitting assembly T of the baling machine is generally comprised of a transmission 100 which functions to drive a pair of sprockets 96 which in turn drives baler drive chains 97. The transmission 100 is shown in cross-section in FIG. 9 as including an input shaft 92 and an output shaft 93 which are drivingly connected by bevelled gears 94 and 95. The output shaft 93 drives the sprockets 96 and the input shaft 92 includes a splined end for connection to the end of the articulated drive shaft 16.

Figure 10:
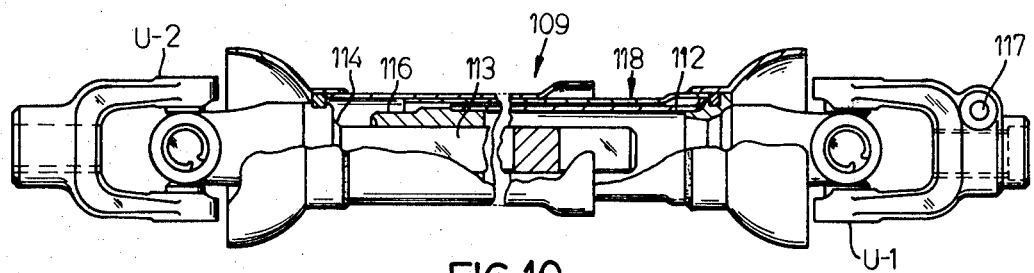
FIG. 10 is an enlarged sectional view of a telescopic shaft assembly and associate parts shown in FIG. 8.

The articulated drive shaft 16 is generally comprised of a torque transmitting telescoping shaft assembly 109 which is connected to the power take-off shaft 7 of the tractor by a front universal joint U-1 and an extension shaft 111 joined to the torque transmitting telescoping shaft assembly 109 by a universal joint U-2 and to the transmission 100 by a universal joint U-3. The telescoping shaft assembly 109 is best shown in FIG. 10 as comprising a tubular section 112 and a solid shaft section 113 including a square cross-section slideably and non-rotatably fitted into the tubular section 112. The universal joints U-1 and U-2 are of the conventional knuckle type and are connected respectively to the tubular and solid shaft sections 112 and 113. A stop means for limiting contraction of the telescoping shaft assembly is provided by a shoulder 114 on the front fork of the universal joint U-2 and an annular end face 116 of the tubular shaft section 112. As shown in FIG. 8, the front fork of the universal joint U-1 is received in splined relationship on the power take-off shaft 7 and is retained thereon by a releaseable latch pin 117. The rear fork of the universal joint U-2 is keyed upon and angularly secured to the front end of the extension shaft 111. Rotation of the power take-off shaft 7 is thus transmitted to the extension shaft 111 through the universal joints U-1 and U-2 and the telescoping shaft assembly 109. The rearward end of the extension shaft 111 is connected by means of the universal joint U-3 in splined relationship to the shaft 92 of the transmission 100. A shear plate 99 connects the universal joint U-3 and the drive shaft 111 and functions to provide protection for the baling mechanism in the event of excessive baling load or in the event that the baler contacts an obstacel, etc. The shaft sections 112 and 114 are protected by a telescoping guard tube 118 and the extension shaft 111 is surrounded by a guard tube 119. The universal joint U-2 is surrounded by a protective bell housing 121 shown in FIG. 1.

Figure 11:
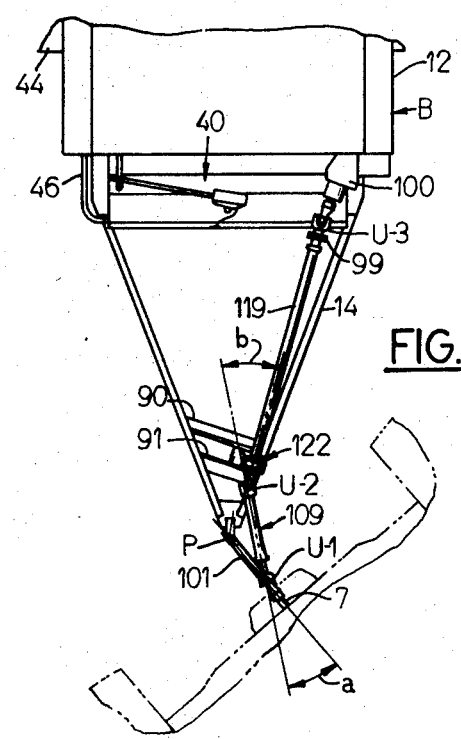
FIG. 11 illustrates the vehicle assembly shown in FIG. 8 in a left turn driving condition at a turning angle of less than 90°.

As shown in FIG. 8, the end of the extension shaft 111 adjacent to the telescoping shaft assembly 109 is rotatably supported by a guide means 122 which is generally secured to the tongue structure 14 and is positioned such that, when the towing vehicle is in a straight pulling position as shown in FIG. 8, the angle $b$ defined by the center line of the extension shaft 111 and the center line of the telescoping shaft assembly 109 is equal to the angle $a$ defined by the center line of the power output shaft 7 and the center line of the telescoping shaft assembly 109. In accordance with well known kinematic principles, rotation of the power take-off shaft 7 via the universal joints U-1, U-2 and U-3 will thus be transmitted to the transmission 100 at a constant angular velocity when angles $a$ and $b$ are equal. The arrangement of the elements of the articulated drive means 16 will function to maintain equality of the relative angles $a$ and $b$ through a wide range of relative turning angles of the tractor with respect to the baling machine, such as that shown in FIG. 11, and a constant angular velocity condition will thus prevail at any of these relative angular displacements of the tractor and the baling machine.

Figure 12:
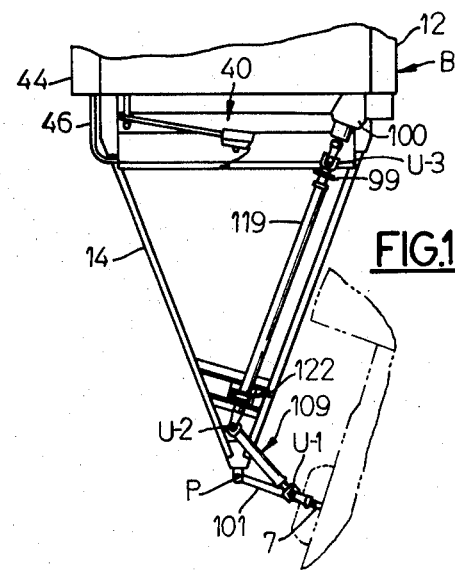
FIG. 12 illustrates the vehicle assembly shown in FIG. 11 but at an increased turning angle.

Though a wide angular turning range is accommodated by the articulated drive means 16, when the tractor turns even more sharply to the left as shown, for example, in FIG. 12, the telescoping shaft assembly 109 will be compressed to assume its shortest possible length and it will place a compressive force against the forward end of the extension shaft 111. In order to permit such sharp turns while avoiding damage to the articulated drive means 16, the guide means 122 supporting the forward end of the shaft 111 pivotably supports the shaft such that it can be forced to pivot from the position shown in FIG. 11 to the position shown in FIG. 12. The guide means 122 is best shown in FIGS. 13–17 and includes a mounting assembly 123 pivotably supporting a vertically extending angular bracket 126 and a horizontally extending crank pin 127. The crank pin 127 is rigidly secured by welding to the vertically extending angular bracket 126. The mounting assembly 123 comprises a generally U-shaped bracket which is bolted to the tongue supporting angles 90 and 91 by bolts 128 and includes a pair of aligned bores therein for rotatably receiving the crank pin 127.

A ball detent mechanism is operably interposed between the vertically extending angular bracket 126 and the mounting assembly 123 for releaseably retaining the vertically extending guide means 122 in a predetermined pivotably adjusted position as shown in FIG. 15. The detent mechanism comprises a ball seating plate 134 rigidly secured to the mounting assembly 123 by welding and two steel balls 135 and 136 which are seated in pockets in the ball seating plate 134 at diametrically opposed positions with respect to the axis of the crank pin 127. A crank plate 129 is welded to the vertically extending angular bracket 126 and includes complementary ball pockets 137 and 138 which are aligned with the pockets in the ball seating plate 134. The ball pockets 137 and 138 are flared to provide conical seating surfaces for the balls 135 and 136 as shown in FIG. 16.

A coil spring 139 surrounds the crank pin 127 and is axially compressed between the mounting assembly 123 and a washer 131 which is supported by a nut 141. The nut 141 is received on the threaded end of the crank pin 127 such that the coil spring 139 biases the plate 129 toward the ball seating plate 134. In the assembled condition of the elements shown in FIG. 17, the ball pockets 137 and 138 register with the balls 135 and 136 respectively, and the compression of the spring 139 secures the balls in respective pockets in aligned relationship. As a result, the guide means 122 is biased so as to be releaseably locked in a rotatably adjusted generally vertical position with respect to the axis of the crank pin 127.

While the tractor and the baler are in the straight ahead driving position as illustrated by FIG. 8, the guide means 122 is resiliently locked by the detent balls 135 and 136 against pivotal movement about the horizontal crank pin 127. When the tractor turns to the left from the FIG. 8 position to the FIG. 11 position, the guide means 122 again remains locked by the detent mechanism and the extension shaft 111 does not pivot around the univeral joint U-3. However, upon continued turning of the tractor to the left from the FIG. 11 position to the FIG. 12 position, the detent mechanism yields and guide means 122 swings counter-clockwise as viewed in FIGS. 11 and 16 about the axis of the crank pin 127. During such counter-clockwise swinging of the guide means 122, the plate 129 and the ball pockets 137 and 138 move counter-clockwise with respect to the balls 135 and 136 and with respect to the seating plate 134. As shown in FIG. 17, a stud 156 is secured to the plate 129 and projects therefrom at the same radial distance from the axis of the crank pin 127 as the ball pocket 138. The axis of the stud 156 is angularly spaced from the ball pocket 138 and the lower end face of the stud 156 is slanted such that the stud will ride up on the ball 136 when the guide means 122 pivots in a counter-clockwise direction, as viewed in FIG. 16. The angular bracket 126 is thus forced to move away from the ball seating plate 134 against the expanding pressure of the coil spring 139. When the guide means 122 has assumed the position shown in FIG. 16, the slanting end face of the stud 156 and the spherical surface of the ball 136 react upon each other to produce a clockwise torque on the guide means 122. This clockwise torque is effective to return the guide means 122 from its position as shown in FIG. 16, to its position in FIG. 13 when the tractor turns from the position shown in FIG. 12 to the position shown in FIG. 11.

Resume

The rotary baling machine of the present invention thus includes both an improved twine feeding mechanism for winding twine around the formed bales as well as an improved drive means facilitating improved operation of the baling mechanism. The twine feeding mechanism includes an improved twine guiding and feeding means which permits controlled wrapping of twine around the bale and a simplified means for cutting the twine at the completion of the wrapping operation. The improved drive means of the baling machine includes a power transmitting means which is positioned laterally with respect to the center line of the baling machine and an articulated drive means connecting the power take-off shaft of the towing vehicle to the power transmitting means. By positioning the power transmitting means to the left of the center line of the baling machine, collection of undesirable debris in front of the bale forming area is avoided and the operator is permitted an unobstructed view of the baling mechanism and of the twine wrapping operation thereby giving him an increased control of the baling operation. The articulated drive means is also particularly adapted to permit a wide range of angular displacement of the towing vehicle and the baler as well as to protect the various elements of the drive means during sharp turns.

I claim:

1. A rotary baling machine for forming large cylindrical bales of cut crop material, wherein said baling machine is operably pulled by a towing vehicle and includes an elongated bale forming zone for receiving cut crop material and for rotatably forming said material into an elongated large cylindrical bale and for rotating said bale, said baling machine including a twine feeding mechanism comprising a pivotable twine feeding tube having a free end swingably movable for controllably feeding twine into said bale forming zone along the length of said zone whereby said twine is wrapped around said rotating bale, means for variably controlling the position of said free end and for controlling the amount of twine wrapped around said bale, and means for cutting said twine including a shiftable blade support means and a cutting blade supported by said shiftable blade support means for shiftable movement with said blade support means for engaging said twine to cut the latter, and said blade support means being shiftable by said pivotable twine feeding tube to thereby cause said blade to engage and cut said twine.

2. A rotary baling machine for forming large cylindrical bales of cut crop material, wherein said baling machine is operably pulled by a towing vehicle and includes an elongated bale forming zone for receiving cut crop material and for rotatably forming said material into an elongated large cylindrical bale and for rotating said bale, said baling machine including a twine feeding mechanism comprising a pivotable twine feeding tube having a free end swingably movable for controllably feeding twine into said bale forming zone along the length of said zone whereby said twine is wrapped around said rotating bale, means for variably controlling the position of said free end and for controlling the amount of twine wrapped around said bale, and means for cutting said twine including a shiftable blade support means and cutting blades supported by said shiftable blade support means for shiftable movement with said blade support means, said shiftable blade support means being pivotably secured at a point intermediate its length, said cutting blades being rigidly secured to one end of said shiftable blade support means, and said shiftable blade support means including a projection at its other end, said projection extending into the path of movement of said twine feeding tube whereby pivotal movement of said twine feeding may contact said projection causing pivotal movement of said shiftable blade support means and engagement of said cutting blades with said twine to cut the twine.

3. A rotary baling machine for forming large cylindrical bales of cut crop material, wherein said baling machine is operably pulled by a towing vehicle and includes an elongated bale forming zone for receiving cut crop material and for rotatably forming said material into an elongated large cylindrical bale and for rotating said bale, said baling machine including a twine feeding mechanism comprising a pivotable twine feeding tube having a free end swingably movable for controllably feeding twine into said bale forming zone along the length of said zone whereby said twine is wrapped around said rotating bale, means for variably controlling the position of said free end and for controlling the amount of twine wrapped around said bale, and means for cutting said twine including a shiftable blade support means and cutting blade means supported by said shiftable blade support means for shiftable movement with said blade support means, and said blade support means being shiftable by said pivotable twine feeding tube to thereby cause said cutting blade means to engage and cut said twine, said means for controlling the position of said twine feeding tube including a hydraulic motor and means for actuating said motor, said actuating means including a valve means controllable from said towing vehicle, and said hydraulic motor being supported by adjustable mounting means.

4. A rotary baling machine for forming large cylindrical bales of cut crop material and of the type pulled by a towing vehicle, said vehicle having a laterally central power output shaft, said baling machine including a forwardly extending laterally central tongue structure connectable to said towing vehicle closely adjacent to said laterally central power output shaft whereby said rotary baling machine may be pulled centrally behind said towing vehicle, and said baling machine having opposite lateral sides and including a transversely elongated bale forming zone having opposite ends one adjacent each of said lateral sides and for receiving cut crop material and for rotatably forming said material into an elongated large cylindrical bale, said zone extending transversely across said machine and being visible to the operator of said vehicle, said machine having a transmission means positioned laterally offset to one side of said baling machine and only at one of said ends of said zone to provide complete visibility of said zone to an operator on said vehicle, a power drive shaft connected and extending between said laterally central power output shaft snd said laterally offset transmission means and at an acute angle when viewed in plan and with respect to the direction of motion of said towing vehicle so as to be positioned completely out of the operator's view of said zone when the operator is on said vehicle to thereby provide clear visibility of all of said bale forming zone.

5. A rotary baling machine for forming large cylindrical bales of cut crop material and of the type pulled by a towing vehicle, said vehicle having a laterally central power output shaft, said baling machine including an elongated bale forming zone for receiving cut crop material and for rotatably forming said material into an elongated large cylindrical bale, said zone being visible to the operator of said vehicle, said machine having a transmission means positioned laterally offset to one side of said baling machine and a power drive shaft connected and extending between said laterally central power output shaft and said laterally offset transmission means and at an angle with respect to the direction of the motion of said towing vehicle to provide clear visibility of said bale forming zone, said power drive shaft including an extension shaft pivotably connected at one end to said transmission means and a torque transmitting telescopic shaft assembly universally connected at one end to said power output shaft of said towing vehicle and further including guide means for the forward end of said extension shaft whereby the latter is supported for generally horizontal arcuate back and forth swingable motion.

6. The rotary baling machine set forth in claim 5, wherein said guide means includes a vertically extending support means having an upper end rotatably supporting said extension shaft and a lower end pivotably mounted to said baling machine for rotation about a horizontal axis.

7. The rotary baling machine set forth in claim 6, wherein said guide means includes detent means for releaseably locking said vertically extending support means against arcuate movement and for biasing said vertically extending support means in a generally vertical position when said support means pivots about said horizontal axis.

8. In combination, a towing vehicle and a rotary baling machine for forming large cylindrical bales of cut crop material wherein said baling machine is operably pulled by said towing vehicle and includes an elongated bale forming zone for receiving cut crop material, for rotatably forming said material into an elongated large cylindrical bale and for rotating said bale, said zone being visible to the operator of said vehicle, said baling machine including a twine feeding mechanism comprising a pivotable twine feeding tube having a free end swingably movable for controllably feeding twine into said bale forming zone along the length of said zone whereby said twine is wrapped around said rotating bale, means for variably controlling the position of said free end for contolling the amount of twine wrapped around said bale, and means for cutting said twine including a shiftable blade support means and a cutting blade supported by said shiftable blade support means for shiftable movement with said blade support means for engaging said twine to cut the latter, and said blade support means being shiftable by said pivotable twine feeding tube to thereby cause said blade to engage and cut said twine, said vehicle having a laterally central power output shaft, and said baling machine having a transmission means positioned laterally offset to one side of said baling machine and a power drive shaft connected and extending between said laterally central power output shaft and said laterally offset transmission means and at an angle with respect to the direction of motion of said towing vehicle to provide clear visibility of said bale forming zone.

* * * * *